(12) United States Patent
Cao et al.

(10) Patent No.: US 8,155,523 B2
(45) Date of Patent: Apr. 10, 2012

(54) WDM PON RF OVERLAY ARCHITECTURE BASED ON QUANTUM DOT MULTI-WAVELENGTH LASER SOURCE

(75) Inventors: Bin Cao, Kanata (CA); Rong Chen, Ottawa (CA)

(73) Assignee: LG-Ericsson Co., Ltd., Seoul (KR)

( * ) Notice: Subject to any disclaimer, the term of this patent is extended or adjusted under 35 U.S.C. 154(b) by 533 days.

(21) Appl. No.: 12/341,012

(22) Filed: Dec. 22, 2008

(65) Prior Publication Data

US 2010/0046946 A1 Feb. 25, 2010

Related U.S. Application Data

(60) Provisional application No. 61/090,644, filed on Aug. 21, 2008.

(51) Int. Cl.
*H04J 14/00* (2006.01)
(52) U.S. Cl. .................... 398/68; 398/67; 398/72
(58) Field of Classification Search .............. 398/67, 398/68, 70–72
See application file for complete search history.

(56) References Cited

U.S. PATENT DOCUMENTS

| | | | | |
|---|---|---|---|---|
| 5,694,234 | A * | 12/1997 | Darcie et al. ............. | 398/72 |
| 2002/0141020 | A1 * | 10/2002 | Doucet et al. ............ | 359/172 |
| 2006/0177223 | A1 | 8/2006 | Hwang et al. ............ | 398/71 |
| 2007/0274729 | A1 | 11/2007 | Lee et al. | |
| 2008/0138088 | A1 | 6/2008 | Welch et al. | |
| 2009/0196612 | A1 * | 8/2009 | Lee et al. ............. | 398/72 |

OTHER PUBLICATIONS

Shin, Dong Jae, et al.; "Low-Cost WDM-PON With Colorless Bidirectional Transceivers"; Journal of Lightwave Technology; vol. 24, No. 1; Jan. 2006; pp. 158-165.

Moon, Jung-Hyung et al.; "Overlay of Broadcasting Signal in a WDM-PON"; Optical Fiber Communication Conference and National Fiber Optic Engineers Conference; Jan. 1, 2006; 3 pages (XP-009093950).

Cho, Jinwoo, et al.; "Broadcast Transmission in WDM-PON Using a Broadband Light Source"; Optical Fiber Communication Conference and Exposition National Fiber Optic Engineers Conference; Mar. 25-29, 2007, Anaheim, CA, Mar. 1, 2007; 3 pages (XP-031146902).

Mun, Sil-gu, et al.; "A WDM-PON with a 40Gb/s (32 x 1.25 Gb/s) Capacity Based on Wavelength-Locked Fabry-Perot Laser Diodes"; Fiber Optical and Optical Communications, Optics Express, (Published Jul. 14, 2008) vol. 16, No. 15, Jul. 21, 2008, pp. 11361-11368 (XP-002544318). http://www.opticsinfobase.org/DirectPDFAccess/8474F3FC-BDB9-137E-CB1005OED621B12A167812.pdf?da=1&id=167812&seq=0.

European Search Report dated Sep. 17, 2009.
U.S. Office Action dated Nov. 8, 2011 for related U.S. Appl. No. 12/480,803.

* cited by examiner

*Primary Examiner* — Nathan Curs
(74) *Attorney, Agent, or Firm* — KED & Associates LLP

(57) ABSTRACT

In a Wavelength Division Multiplexed Passive Optical Network (WDM-PON) including, a system for overlaying an analog broadcast signal. An Optical Line Terminal of the WDM-PON includes a broadband light source for generating uplink seed light for each uplink channel of the WDM-PON, and a modulator for modulating the analog broadcast signal onto the uplink seed light. An Optical Network Terminal of the WDM-PON receives the uplink seed light from the Optical Line Terminal, and includes an optical divider for dividing the received seed light into a first signal and a second signal; a light source for generating an uplink data signals using the first signal as seed light; and an RF receiver for detecting the analog broadcast signal modulated on the second signal.

6 Claims, 3 Drawing Sheets

WDM PON RF OVERLAY ARCHITECTURE BASED ON QUANTUM DOT MULTI-WAVELENGTH LASER SOURCE

CROSS-REFERENCE TO RELATED APPLICATIONS

This application is based on, and claims priority from, U.S. Provisional Patent Application Ser. No. 61/090,644, filed Aug. 21, 2008, the entire contents of which are incorporated herein by reference.

FIELD OF THE INVENTION

The present application relates generally to Wavelength Division Multiplexed Passive Optical Networks (WDM PON) and, more specifically, to a method to overlay analog RF/Video broadcast signalling on a WDM-PON network.

BACKGROUND OF THE INVENTION

A passive optical network (PON) is a point-to-multipoint network architecture in which unpowered optical splitters are used to enable a single optical fibre to serve multiple premises. A PON typically includes an Optical Line Terminal (OLT) at the service provider's central office connected to a number (typically 32-128) of Optical Network Terminals (ONTs), each of which provides an interface to customer equipment.

In operation, downstream signals are broadcast from the OLT to the ONTs on a shared fibre network. Various techniques, such as encryption, can be used to ensure that each ONT can only receive signals that are addressed to it. Upstream signals are transmitted from each ONT to the OLT, using a multiple access protocol, such as time division multiple access (TDMA), to prevent "collisions".

A Wavelength Division Multiplexing PON, or WDM-PON, is a type of passive optical network in which multiple optical wavelengths are used to increase the upstream and/or downstream bandwidth available to end users. FIG. 1 is a block diagram illustrating a typical WDM-PON system. As may be seen in FIG. 1, the OLT 4 comprises a plurality of transceivers 6, each of which includes a light source 8 and a detector 10 for sending and receiving optical signals on respective wavelength channels, and an optical combiner/splitter 12 for combining light from/to the light source 8 and detector 10 onto a single optical fibre 14. The light source 8 may be a conventional laser diode such as, for example, a distributed feed-back (DFB) laser, for transmitting data on the desired wavelength using either direct laser modulation, or an external modulator (not shown) as desired. The detector 10 may, for example, be a PIN diode for detecting optical signal received through the network. An optical mux/demux 16 (such as, for example, an Arrayed Waveguide Grating— AWG—, or a Thin-Film Filter—TFF) is used to couple light between each transceiver 6 and an optical fibre trunk 18, which may include one or more passive optical power splitters (not shown).

A passive remote node 20 serving one or more customer sites includes an optical mux/demux 22 (which may, for example, also be an AWG or TFF) for demultiplexing wavelength channel (λ1 . . . λn) from the optical trunk fibre 18. Each wavelength channel is then routed to an appropriate PON 24 comprising one or more Optical Network Terminals (ONTs) 26 at respective customer premises. Typically, each ONT 26 includes a light source 28, detector 30 and combiner/splitter 32, all of which are typically configured and operate in a manner mirroring that of the corresponding transceiver 6 in the OLT 4.

Typically, the wavelength channels (λ1 . . . λn) of the WDM-PON are divided into respective channel groups, or bands, each of which is designated for signalling in a given direction. For example, L-band (1565-1625 nm) channels are typically allocated to downlink signals from the OLT 4 to each of the PONs 24, while C-band (1530-1565 nm) channels are allocated to uplink signals transmitted from each PON 24 to the OLT 4. In such cases, the respective optical combiner/splitters 12,32 in the OLT transceivers 6 and ONTs 26 are commonly provided as passive optical filters well known in the art.

The WDM-PON illustrated in FIG. 1 is known, for example, from "Low Cost WDM PON With Colorless Bidirectional Transceivers", Shin, D J et al, Journal of Lightwave Technology, Vol. 24, No. 1, January 2006. With this arrangement, each PON 24 is served by a predetermined pair of wavelength channels, comprising an L-band channel for downlink signals transmitted from the OLT 4 to the respective PON 24, and a C-band channel for uplink signals transmitted from the respective PON 24 to the OLT 4. The MUX/DE-MUX 16 in the OLT 4 directs couples the selected channels of each PON 24 to a respective one of the transceivers 6. Consequently, each transceiver 6 of the ONT is associated with one of the PONs 24, and controls uplink and downlink signalling between the ONT 4 and that PON 24. Each transceiver 6 and 26 in the OLT 4 and ONTs is rendered "colorless", by using reflective light sources 8, 28, such as, reflective semiconductor optical amplifiers; injection-locked Fabry-Perot lasers; reflective electro-absorptive modulators; and reflective Mach-Zehnder modulators. With this arrangement, each light source 8, 28 requires a "seed" light which is used to produce the respective downlink/uplink optical signals. In the system of FIG. 1, the seed light for downlink signals is provided by an L-band broadband light source (BLS) 32 via an L-band optical circulator 34. Similarly, the seed light for uplink signals is provided by a C-band broadband light source (BLS) 36 via a C-band optical circulator 38.

WDM-PONs suffer a limitation in that they are designed around a one-to-one connection paradigm. That is, each transceiver 6 of the OLT 4 communicates with the ONT(s) 26 of only one PON 24. However, it is desirable to also be able to broadcast analog signals to all of the ONT(s) 26. For example, it would be desirable to be able broadcast analog RF/video signals to subscribers through the WDM-PON infrastructure. Furthermore, it would be desirable to be able to provide this capability without compromising the performance of the WDM-PON or requiring active components within the network.

SUMMARY OF THE INVENTION

An aspect of the present invention provides, in a Wavelength Division Multiplexed Passive Optical Network (WDM-PON), a system for overlaying an analog broadcast signal. An Optical Line Terminal of the WDM-PON includes a broadband light source for generating uplink seed light for each uplink channel of the WDM-PON, and a modulator for modulating the analog broadcast signal onto the uplink seed light. An Optical Network Terminal of the WDM-PON receives the uplink seed light from the Optical Line Terminal, and includes an optical divider for dividing the received seed light into a first signal and a second signal; a light source for generating an uplink data signals using the first signal as seed light; and an RF receiver for detecting the analog broadcast signal modulated on the second signal.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF PREFERRED EMBODIMENTS

The present invention provides techniques for overlaying RF-Video broadcast signalling on a Wavelength Division Multiplexing Passive Optical Network (WDM-PON). A representative embodiment is described below with reference to FIGS. 2-4.

Figure 1:
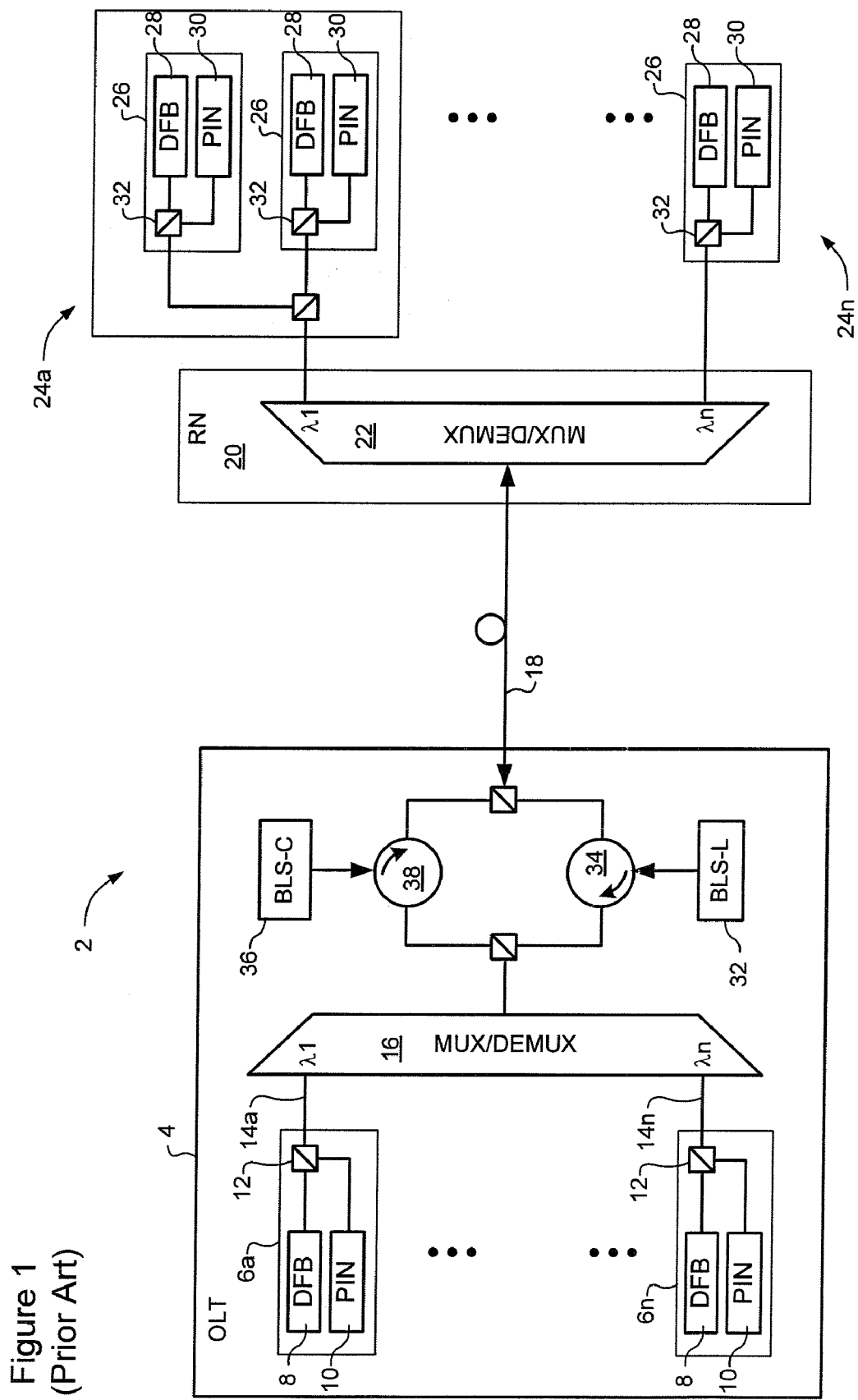
FIG. 1 schematically illustrates a conventional WDM-PON known in the prior art.
Figure 2:
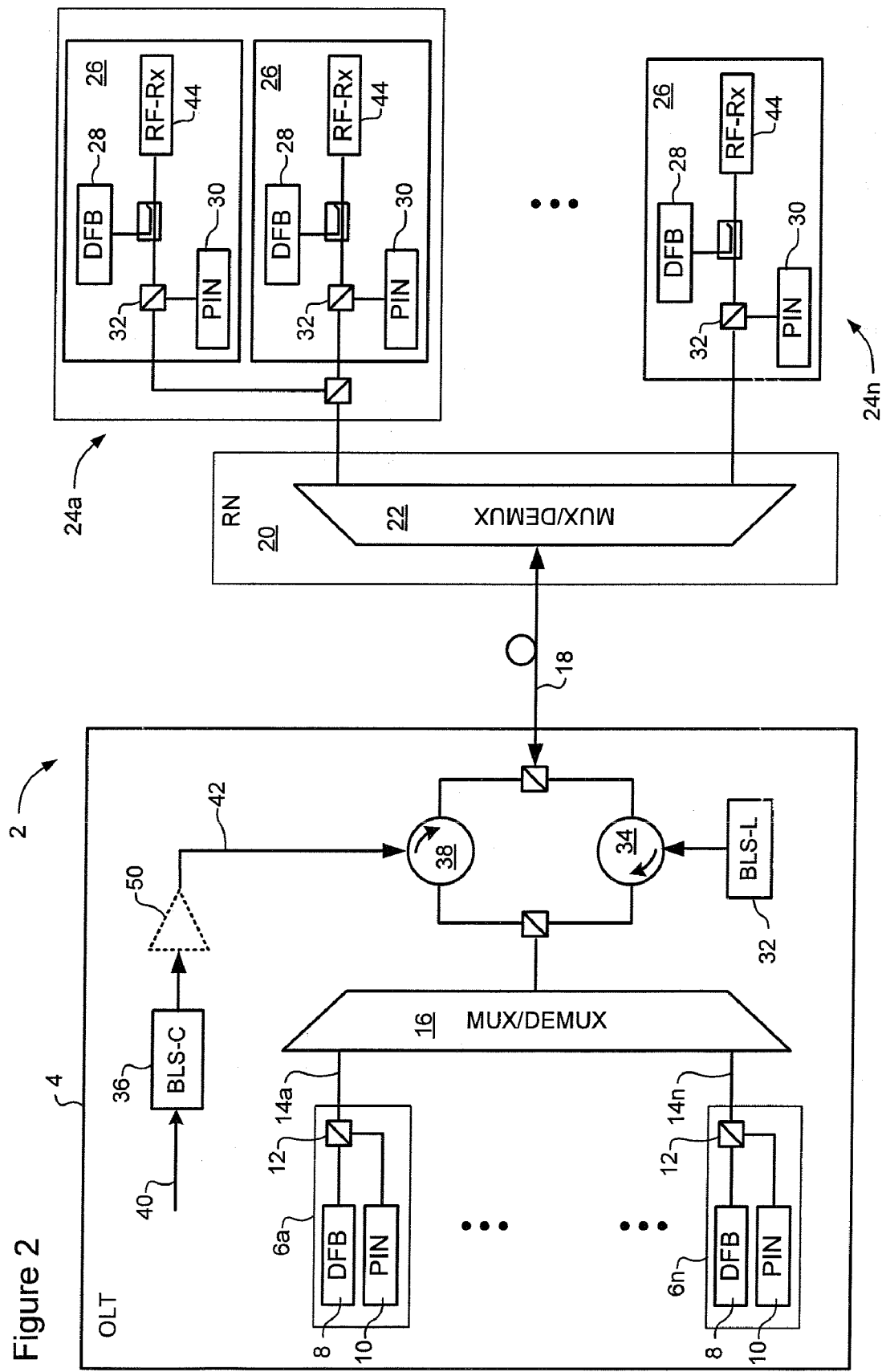
FIG. 2 schematically illustrates a WDM-PON in accordance with a representative embodiment of the present invention.
Figure 4:
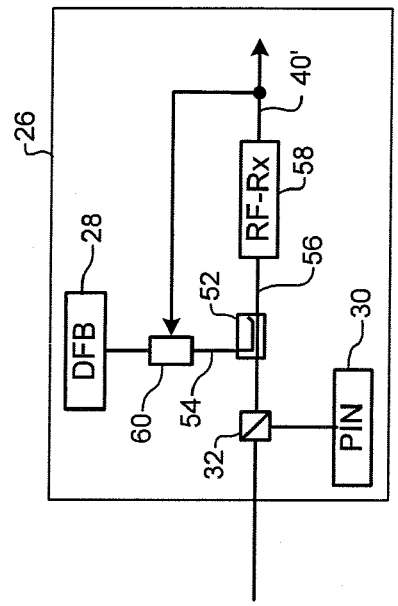
FIG. 4 schematically illustrates am Optical Network Terminal usable in the WDM-PON of FIG. 2.

Referring to FIGS. 2-4, in very general terms, analog RF/Video signals 40 are modulated onto the uplink seed light 42 which is distributed to the ONT(s) 26 at each customer site. At each ONT 26, the inbound seed light is divided into two signals; one of which is used as a seed light for the light source 28, and the other is supplied to an RF receiver 44 for detection of the RF/Video signals.

Figure 3A:
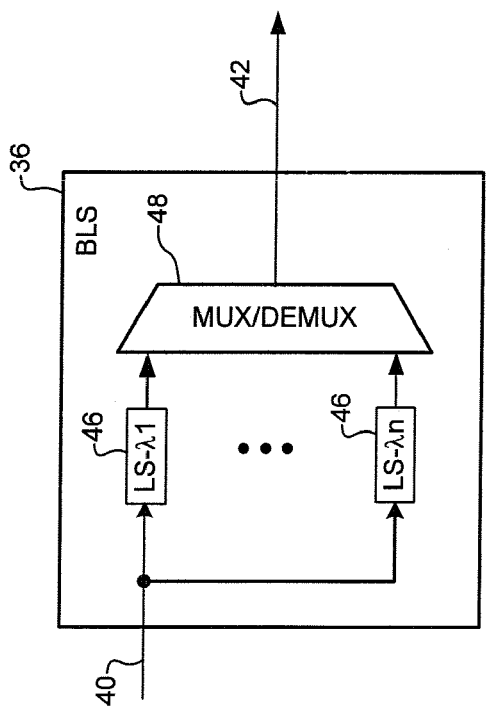
FIGS. 3a and 3b schematically illustrate respective alternative broadband light sources usable in the WDM-PON of FIG. 2.
Figure 3B:
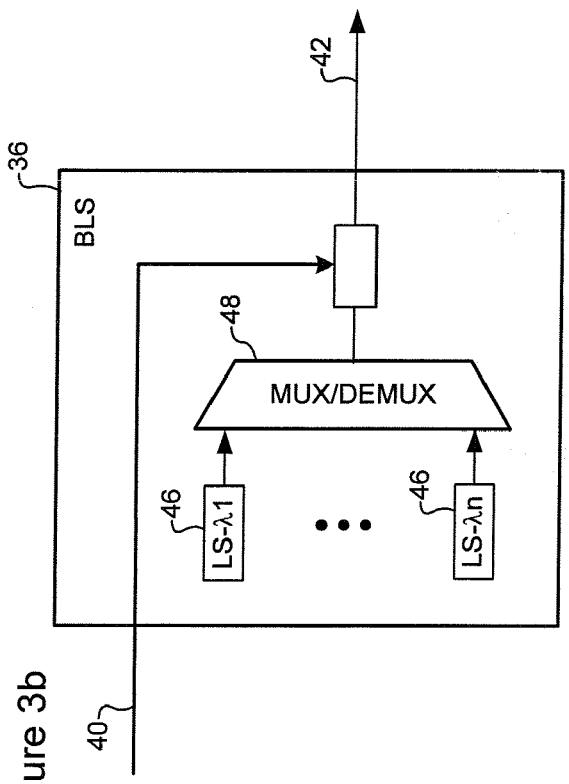

If desired, the uplink seed light 42 can be generated by a broadband light source (BLS) 36 in a conventional a manner. FIGS. 3a and 3b illustrate representative embodiments of the BLS 36, in which a set of narrow-band lasers 46 are used to generate respective narrow band seed lights, each of which is tuned to the center wavelength of a respective uplink channel of the WDM-PON. A multiplexer 48 combines the narrow-band seed lights to produce the uplink seed light 42, which is then distributed through the WDM-PON to the ONTs 26. If desired, each of the narrow-band lasers 46 may be provided as conventional bulk semiconductor laser diodes. Alternatively, multi-channel quantum dot lasers can be used, in which case the number of laser diodes needed to produce all of the narrow-band seed lights is reduced. Multi-channel quantum dot based lasers are known in the art. In some embodiments, a single multi-channel quantum dot laser may be used to generate all of the desired narrow-band seed lights, in which case the multiplexer 48 is not required. As is known in the art, seed lights emitted by semiconductor and quantum dot lasers are incoherent and polarized. In cases, where the ONT light sources 28 are polarization dependent, it may be desirable to de-polarize the uplink seed light 42 using methods known in the art. Any suitable technique may be used to modulate the RF/video signal 40 onto the uplink seed light 42, including direct modulation and external modulation methods shown in FIGS. 3a and 3b, respectively. In a WDM-PON in which uplink signals are generated using an intensity modulation technique (such as On-Off-Keying (OOK)) the RF/video signals 40 may be modulated onto the uplink seed light using a phase or (equivalently) frequency modulation technique. In some cases, this may reduce interference between the RF/Video signals 40 modulated onto the uplink seed light 42 and the uplink signals that are generated by the respective light source 28 of each ONT 26 using the uplink seed light 42.

If desired, an optical amplifier 50 (for example an Erbium Doped Fiber Amplifier (EDFA)) can be used to amplify the uplink seed light 42 at the output of the uplink BLS 36. This arrangement is useful for increasing link budget (and thus signal reach) of the uplink signals, particularly in view of the optical losses caused by splitting the uplink seed light 42 in each of the ONTs 26.

As may be seen in FIGS. 2 and 4, the ONT 26 includes an optical combiner/splitter 32, which operates in a conventional manner to separate the uplink seed light 42 from downlink signals received from the OLT 4. The downlink signals received from the OLT 4 are supplied to a downlink detector 30 in a conventional manner. The uplink seed light 42, on the other hand, is supplied to the power splitter 52 (for example a conventional 3 dB splitter) and divided into a pair of signals 54 and 56. A first one of the signals 54, is supplied to the ONT light source 30 and used as a seed light for generation of uplink signals in a conventional manner. The second one of the signals 6 is supplied to an RF receiver 58 for detection of the RF/video signal 40.

As may be appreciated, modulation of the RF/video signals onto the uplink seed light 42 implies that the signal (seed light) 54 received by the ONT light source 28 contains variations of intensity and/or phase. In some case, these variations can appear as noise in the uplink data signal generated by the ONT light source 28. In the embodiment illustrated in FIG. 4, this problem is overcome by using a signal shaper 60 between the optical power divider 52 and the ONT light source 28. In general, the signal shaper 60 operates to minimize undesirable variations in the uplink seed light 42 due to the presence of the RF/Video signal 40. As such, the specific design of the signal shaper 60 will depend on the modulation format of the RF/Video signal 40. For example, in embodiments in which the RF/Video signal 40 is modulated onto the uplink seed light 42 using a phase modulation scheme, the signal shaper 60 can be provided as an optical phase-shifter driven by the detected RF/Video signal 40' output by the RF receiver 58. Similarly, in an embodiment in which the RF/Video signal 40 is modulated onto the uplink seed light 42 using an intensity modulation scheme, the signal shaper 60 can be provided as a variable optical attenuator (or alternatively, or a variable optical amplifier) driven by the detected RF/Video signal 40' output by the RF receiver 58.

The embodiments of the invention described above are intended to be illustrative only. The scope of the invention is therefore intended to be limited solely by the scope of the appended claims.

We claim:

1. A system for overlaying an analog broadcast signal, comprising:
    an Optical Line Terminal of a Wavelength Division Multiplexed Passive Optical Network (WDM-PON), including a broadband light source for generating uplink seed light for each uplink channel of the WDM-PON, and a modulator for modulating the analog broadcast signal onto the uplink seed light;
    an Optical Network Terminal of the WDM-PON; and
    a signal shaper to reduce variations in the first signal due to the analog broadcast signal, the Optical Network Terminal receiving the uplink seed light from the Optical Line Terminal and comprising:
    an optical divider for dividing the received seed light into a first signal and a second signal;

a light source for generating an uplink data signals using the first signal as seed light; and an RF receiver for detecting the analog broadcast signal modulated on the second signal, wherein the modulator is operative to modulate the analog broadcast signal onto the uplink seed light using a phase modulation scheme, and wherein the signal shaper comprises an optical phase-shifter driven by the detected analog broadcast signal output by the RF receiver.

2. The system as claimed in claim 1, wherein the broadband light source comprises a quantum dot based multi-channel laser.

3. The system as claimed in claim 1, further comprising an optical amplifier for amplifying the uplink seed light generated by the broadband light source.

4. A system for overlaying an analog broadcast signal, an Optical Line Terminal of a Wavelength Division Multiplexed Passive Optical Network (WDM-PON), including a broadband light source for generating uplink seed light for each uplink channel of the WDM-PON, and a modulator for modulating the analog broadcast signal onto the uplink seed light;

an Optical Network Terminal of the WDM-PON; and a signal shaper to reduce variations in the first signal due to the analog broadcast signal, the Optical Network Terminal receiving the uplink seed light from the Optical Line Terminal and comprising:

an optical divider for dividing the received seed light into a first signal and a second signal;

a light source for generating an uplink data signals using the first signal as seed light; and an RF receiver for detecting the analog broadcast signal modulated on the second signal, wherein the modulator is operative to modulate the analog broadcast signal onto the uplink seed light using an intensity modulation scheme, and wherein the signal shaper comprises a variable optical attenuator or optical amplifier driven by the detected analog broadcast signal output by the RF receiver.

5. An Optical Network Terminal (ONT) of a Wavelength Division Multiplexed Passive Optical Network (WDM-PON), comprising:

an optical divider to divide seed light into a first signal and a second signal;

a light source to generate uplink data signals using the first signal as seed light;

a receiver to detect a broadcast signal modulated on the second signal; and a signal shaper to reduce variations in the first signal, wherein the signal shaper comprises an optical phase-shifter driven by the detected broadcast signal output by the receiver.

6. An Optical Network Terminal (ONT) of a Wavelength Division Multiplexed Passive Optical Network (WDM-PON), comprising:

an optical divider to divide seed light into a first signal and a second signal;

a light source to generate uplink data signals using the first signal as seed light;

a receiver to detect a broadcast signal modulated on the second signal; and a signal shaper to reduce variations in the first signal, wherein the signal shaper comprises a variable optical attenuator or optical amplifier driven by the detected broadcast signal output by the receiver.

* * * * *